April 13, 1926.
J. H. SHAY
1,580,540
VEHICLE SPRING MOUNTING
Filed Sept. 25, 1925      2 Sheets-Sheet 1
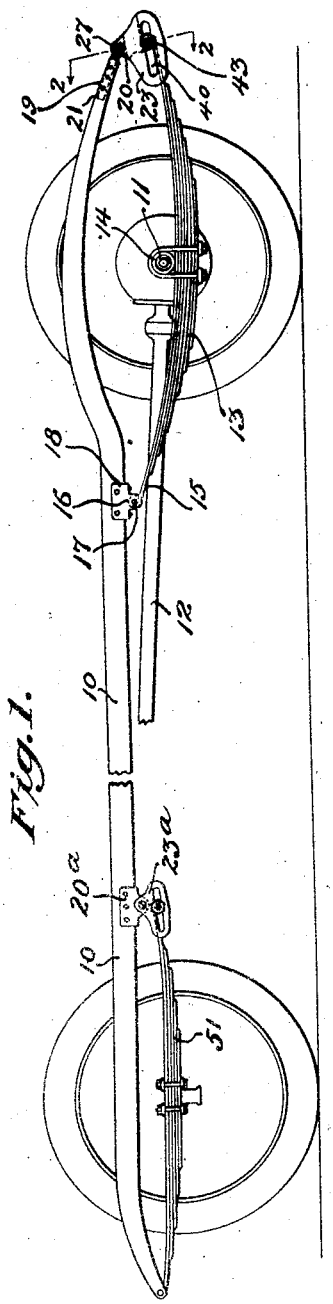
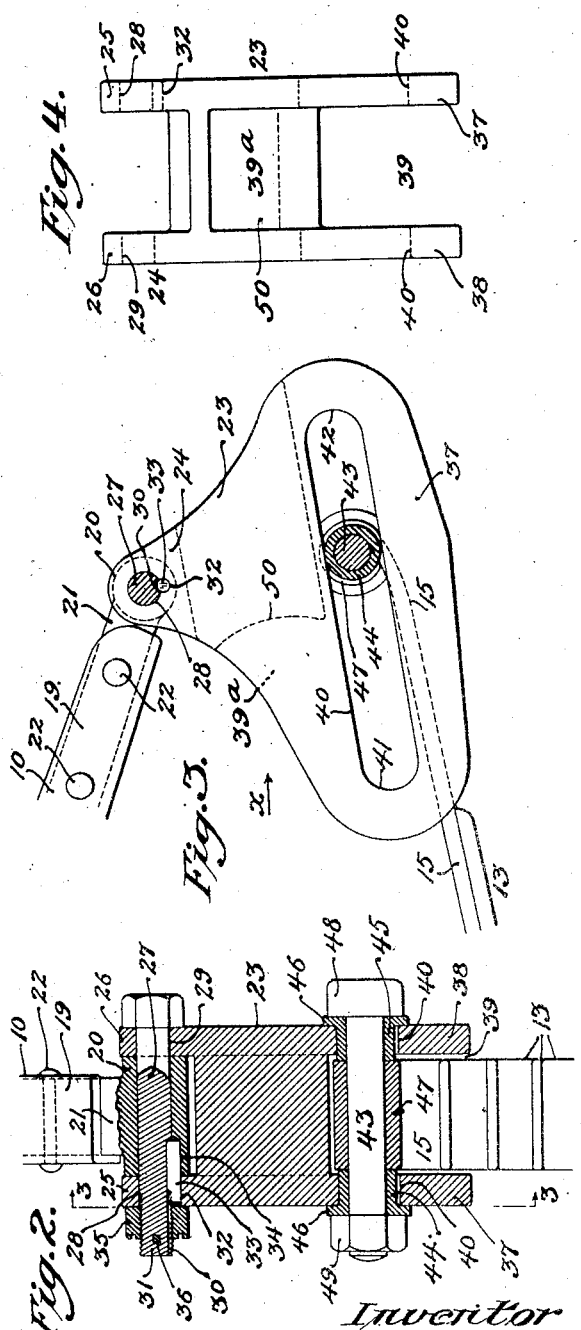
Witnesses,
Rae Newmark
Arthur B. Fraser
Inventor
James H. Shay
by Augustus B. Coppes
his Attorney.

April 13, 1926.
J. H. SHAY
1,580,540
VEHICLE SPRING MOUNTING
Filed Sept. 25, 1925
2 Sheets-Sheet 2
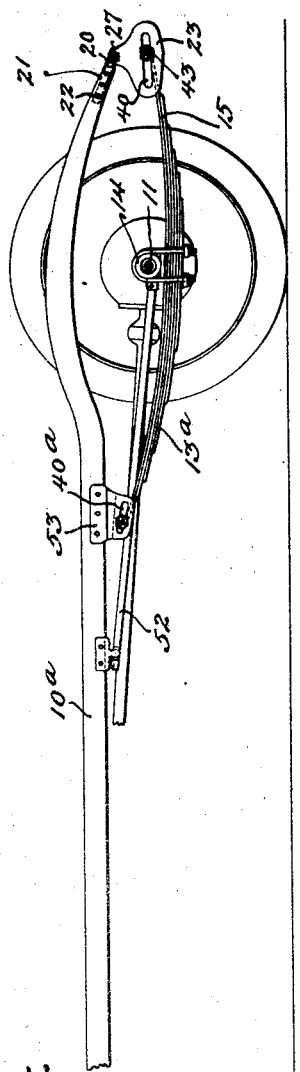
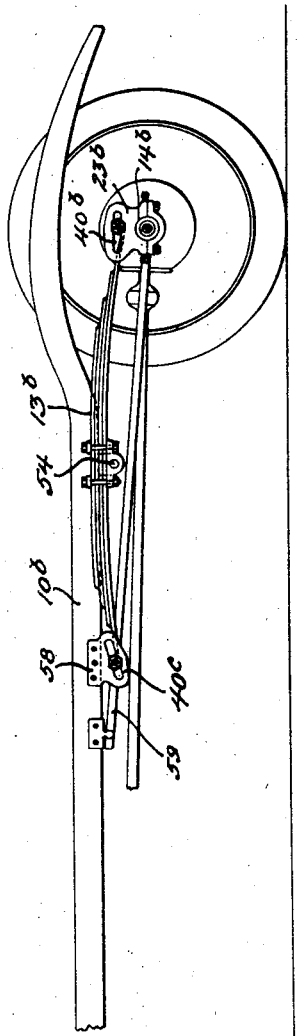
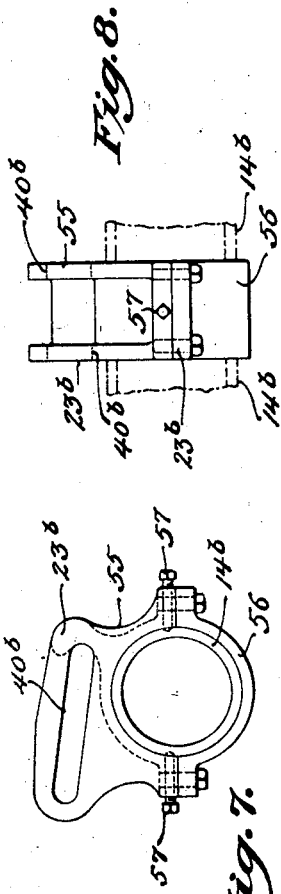
Inventor
James H. Shay Patented Apr. 13, 1926.

1,580,540

UNITED STATES PATENT OFFICE.

JAMES H. SHAY, OF PHILADELPHIA, PENNSYLVANIA.

VEHICLE SPRING MOUNTING.

Application filed September 25, 1925. Serial No. 58,565.

*To all whom it may concern:*

Be it known that I, JAMES H. SHAY, a citizen of the United States, residing in Philadelphia, Pennsylvania, have invented certain Improvements in Vehicle Spring Mountings, of which the following is a specification.

It has been found in actual practice that with vehicle spring mountings employing shackles or links which are attached to the frame and to the ends of the springs that the supporting shackle or link structure restricts the action of the spring substantially to the arc of movement of the links of shackles and thereby prevents the springs from taking full advantage of their normal arcs or curves when they function to accommodate existing conditions during the movement of the vehicle over an irregular roadway. Furthermore, with said shackle or link construction the action of the springs are limited for as soon as the shackles or links pass certain points during their swinging movement they act as levers between the springs and frame which action increases the load which the springs have to lift before the springs are able to return to their normal positions or curves. As the springs finally assume their normal position said shackles or links have also returned but have produced a very quick snap up or down movement which they transmit to the frame and body of the car. The shock thus given to the car is only eliminated after the car has progressed a considerable distance. However, any shocks which are received in the meantime, or before the springs have attained their normal positions, will occur at a time when the springs cannot respond to prevent the shock from reaching the frame and body. This is all due to the restricted action of the shackle or link construction with the resulting leverage above mentioned and for this reason such mountings have not been satisfactory.

Various constructions have previously been made in spring mountings designed to give a smoother and more uniform spring absorption of shock, such for example as by means allowing the rear end portions of the springs to run or bear on rollers which are supported by the axle casing. While said latter construction has advantages over the link and shackle mounting above mentioned, nevertheless there is possibility of binding of the spring at the roller mounting points and resulting objectionable vibration.

One object of my invention is to provide an improved vehicle spring mounting which will be instrumental in keeping the frame and body of the vehicle at a substantially horizontal position during the progress of the vehicle over an irregular roadway, and to prevent objectionable quick up and down movement of the frame and body of the vehicle.

Another object is to so construct my improved spring mounting that it will allow the spring to return to normal with a sliding motion in such manner that it will be free of objectionable vibration and will impart no abrupt leverage upon the spring and so as to eliminate the possibility of any objectionable sudden lift or downward pull of the frame.

A further object is to so make my invention that the slight lift or downward pull upon the frame will be effected by allowing free action of the spring without imparting restricting leverage thereupon.

A still further object is to so arrange and construct the parts of my improved spring mounting that they can be readily applied and adjusted to suit various spring curvatures and sizes so that they can be made to function at their highest efficiency even though the curvature or size of the springs may vary and even though the shape and size of the frames may vary.

These objects and other advantageous ends which will be set forth hereinafter, I attain in the following manner, reference being had to the accompanying drawings in which—

Figure 1 is a side elevation illustrating my improved vehicle spring mounting in connection with the frame of an automobile, Figure 2 is an enlarged section taken on the line 2—2 of Figure 1, Figure 3 is a fragmentary section taken on the line 3—3 of Figure 2, Figure 4 is a detail end elevation of one of the parts of my invention looking in the direction of the arrow $x$ in Figure 3, Figure 5 is a fragmentary elevation showing my improved spring mounting when attached to both sides of a frame-supporting spring of an automobile, Figure 6 is a fragmentary elevation showing my improved spring mounting at both ends of a spring of the cantilever type in which the spring between its ends is pivotally supported on a portion of the automobile frame, Figure 7 is an enlarged side elevation of one of the spring end mountings shown in Figure 6, and Figure 8 is an end elevation of the structure shown in Figure 7.

Referring to the drawings, and particularly to Figures 1 to 4 inclusive, 10 represents an automobile frame and 11 the rear driving axle, the latter being operated by a drive shaft 12 in the usual manner of automobile construction and operation. A laminated or leaf-spring 13 is supported between its ends on the rear axle tube 14, the spring in the present instance being curved or semi-elliptic.

The top or main leaf 15 of the spring has its forward end 16 bent to form an eye which encircles a pin or bolt 17 in a bracket 18 which is secured to the frame 10. Thus, said leaf 15 in addition to assisting in supporting the frame also serves to take up the driving torque of the automobile. It may be here stated that the end 16 of the leaf can slightly pivot on the pin or bolt 17 to compensate for varying distance between the frame and the axle 11 during the progress of the automobile over a roadway.

The rear end 19 of the frame 10 carries a projecting eye or sleeve 20 which may either be made integral with the frame as is usually the custom for supporting ordinary spring suspending links or shackles or it may be formed on the end of a stem or bar 21 as illustrated, the bar 21 being riveted or otherwise suitably secured to the end of the frame 10. As illustrated, the stem 21 is secured to the rear end 19 of the frame 10 by means of rivets 22.

In carrying out my invention I have shown a part 23 in the form of a bracket which is supported by the sleeve or eye 20 in a manner now to be described. The upper end 24 of the bracket 23 is bifurcated, the furcations 25 and 26 spanning the opposite ends of the sleeve 20 as clearly shown in Figure 2. A bolt 27 extends through the sleeve and through holes 28 and 29 in the furcations 25 and 26. The bolt has a groove 30 extending partway of its length inward from the end 31 to provide part of a keyway, said furcation 25 also being grooved at 32 at a position suitable for the proper adjustment and positioning of the bracket 23 as will hereinafter be more fully described, it being here sufficient to state that the groove 32 is complementary to the groove 30 of the bolt 27 to provide a keyway for a securing key 33. The sleeve 20 is also grooved at 34, which groove is adapted to register with a part of the groove 30 of the bolt 27 to receive a portion of the key 33 so that after adjustment of the bracket 23 it will be immovable relatively to the frame 10. A nut 35 is screwed on the bolt 27, said nut being of the castellated type which is locked to the nut 35 by means of a cotter pin 36.

The bracket 23 is bifurcated at its bottom to provide two wings or ears 37 and 38 which are of comparatively great length, as shown in Figures 1 and 3, and provide a space 39 for accommodation of the rear end of the spring 13 as will hereinafter be more fully set forth. Each of the wings 37 and 38 has an elongated slot 40, said slots being directly opposite each other and preferably closed at their ends 41 and 42 as clearly shown in Figure 3. A bolt 43 extends transversely through the slots 40 and across the space 39 between the wings 37 and 38 and has mounted thereon two bushing rollers 44 and 45 which are respectively positioned within the slots 40 of the wings 37 and 38. Said rollers have outer flanges 46 of greater diameter than the widths of the slots 40 and are positioned adjacent the outer side surfaces of the wings 37 and 38.

The rear end of the leaf 15 of the spring 13 is formed into an eye 47 which encircles the bolt 43 between the inner opposed ends of the rollers 44 and 45 and so as to occupy the space 39 between the wings 37 and 38 as clearly shown in Figure 2 of the drawings. The head 48 of the bolt 43 is positioned adjacent the outer end surface of the roller 45 and the opposite end of the bolt 43 is provided with a nut 49 adjacent the outer end surface of the roller 44; the rollers 44 and 45 being free to rotate on the bolt 43, said eye 47 of the spring leaf 15 also preferably being free to turn on the bolt 43.

The space between the wings 37 and 38 is preferably extended upward between the wings as shown at 39[a] forward of the connecting portion 50 to provide freedom of movement of the spring between the wings in the event of a heavy load or for any other reason when the spring and frame move relatively close to each other.

To attach the bracket 23 to the sleeve or eyelet 20, the bolt 27 and bracket may first be grooved as above stated and the bolt can be inserted through the furcations 25 and 26 and sleeve 20. The bracket 23 can then be swung so that the lengths of the slots 40 will be at an angle which is adjudged suitable for the curvature of the spring 15, such for example, as the position of the slot 40 as shown in Figure 3. The bolt 27 can then be turned so that its groove 30 will register with the groove 32 in the bracket and a drill can be inserted through the space provided by the combined grooves 30 and 32, and the groove 34 in the sleeve 20 can then be made by the drill so as to align with the grooves 30 and 32. The drill can then be removed and the key 33 inserted. After this action the nut 35 can be applied and the cotter pin 36 inserted. The slots 40 of the bracket 23 are preferably set at an angle slightly nearer the horizontal than the curvature of the top of the spring 13 when the latter is under normal load so that a slight bending of the spring downward would be necessary to bring the slots 40 at the angle of the top of the spring.

From the above description and from the illustrations referred to, it will be obvious that movement of the axle and the frame toward and from each other will cause the spring 13 to flex and the rollers 44 and 45 to freely roll in the slots 40 as guideways. Furthermore, the eye 47 of the leaf 15 of the spring is free to rock on the axis provided by the bolt 43 so that the rear end of the spring is free to move in the direction of the length of the slots 40, and also rock on the axis provided by the bolt 43. Furthermore, since the length and angle of the slots 40 extend substantially in the direction of the length of the spring there will be no leverage placed upon the spring at points within its length which would otherwise cause an attempted buckling of the spring due to restriction of its angle of flex. Thus the slots 40, owing to the mounting of the end of the spring, provide a free end spring race and allow the spring to function to its full extent, and at the same time the spring is adequately supported and guided owing to the structure of the bracket.

In Figure 1, I have also shown my invention applied to the front spring 51 and the principle of operation is substantially the same as described in connection with the rear spring mounting. As illustrated, the bracket 23ª is supported from a fixture 20ª on the frame 10 and the means of connection and operation are substantially the same as described in connection with the rear spring mounting, but differ in shape, and it is therefore believed unnecessary to go into further detail description.

In Figure 5, I have illustrated my invention as applied to both the forward and rear ends of the rear frame supporting spring and in which the structure is such that the spring is not required to take the driving torque. With this construction the driving torque can be taken up either by a torque tube or radius rod of the usual construction and in the drawing. I have illustrated a radius rod 52 for taking the driving torque. I have also illustrated the forward end of the spring 13ª adapted to move relatively to guiding slots 40ª in a bracket 53 which is attached to the frame 10ª, the slots 40ª serving as guideways in the same manner as previously described in connection with the slots 40. The rear end of the spring is mounted similarly to that described in Figures 1 to 4 inclusive and I have therefore given like parts similar reference characters.

In Figure 6, I have shown my invention as applied to a spring 13ᵇ of the cantilever type which is centrally mounted on a pivot pin 54 supported by the frame 10ᵇ. Instead of being supported by the frame, I connect to the rear axle tube 14ᵇ a bracket 23ᵇ having guide slots 40ᵇ forming guideways for the rear end of the spring. The bracket 23ᵇ, as shown in Figures 7 and 8, is made in two sections 55 and 56 which are bolted together around the axle tube 14ᵇ and the section 55 has set screws 57 adapted to engage the axle tube to lock the bracket 23ᵇ to the axle tube 14ᵇ after the bracket has been adjusted to properly position the slots 40ᵇ relatively to the curvature of the spring 13ᵇ. The forward end of the spring 13ᵇ is adapted to be mounted in the same manner as described in connection with the end of the spring in Figure 5 and for this purpose I attach to the frame 10ᵇ a bracket 58 having slots 40ᶜ therein which provide the guideways for the spring. In each of the forms shown in Figures 5 and 6, I preferably bend the free ends of the links around bolts in a manner similar to that described in connection with Figures 1 to 4 inclusive and provide bushing rollers thereon which ride in the respective slots in the brackets.

In the form shown in Figure 6, the driving torque may be taken either by a radius rod or torque tube in the usual manner, and I have illustrated a radius rod 59 for this purpose.

My invention is applicable either to vehicles during their course of construction or it can be applied to cars already in use and the adjustment previously described is sufficient to compensate for slight variations in curvatures and sizes of springs and frames. The guideway slots can be set, for example, at a mean angle to the curvature of the spring when under normal load and that adjudged to exist upon the average rebound of the frame when the car passes over an irregular portion of a roadway and in this manner the greatest efficiency can be obtained.

It will be noted that as the spring slides in the race in one direction, the spring will take a natural downward motion still supporting the frame and will not pull the frame down with it. If, on the other hand, the ground-engaging wheel receives another sudden jolt before the spring returns to normal, the end of the spring will travel in an opposite direction in the guideway and upward at the same time and will not act to raise the frame in so doing. On the contrary, the spring will be flexible at all positions and will absorb practically all the shock without transmitting it to the frame.

While I have illustrated only one side of the frame, in connection with my improved spring mounting, it will be of course understood that my invention can be applied to both sides of the frame in a similar manner to that described and illustrated.

Having thus described my invention what I claim as new and desire to secure by Letters Patent is:

1. In a vehicle spring mounting construction, a spring; a support; and a device having an elongated slotted guideway and being adjustably secured to said support whereby said slotted guideway can be set at a suitable position relatively to the direction of the length of the spring, said spring carrying a portion confined within said guideway and free to move therein in the direction of the length of said guideway.

2. In a vehicle spring mounting construction, a spring; a support; a device having an elongated slotted guideway and being pivotally connected to said support whereby said device can be turned to adjust the guideway to place it at a suitable position relatively to the direction of the length of the spring; and means for securing said device in its adjusted position relatively to said support, said spring carrying a portion confined within said guideway and free to move therein in the direction of the length of said guideway.

3. In a vehicle spring mounting construction, a support; a device having an elongated slotted guideway; a spring carrying a portion confined within said guideway and free to move therein in the direction of the length of said guideway; a bolt connecting said device with said support, said device support and bolt having grooves complementary to produce a keyway; and a key fitting within said keyway.

In testimony whereof, I have signed my name to this specification.

JAMES H. SHAY.